W. E. CALLANE.
CENTRIFUGAL CREAM SEPARATOR.
APPLICATION FILED MAR. 23, 1914.
1,136,654.
Patented Apr. 20, 1915.
3 SHEETS—SHEET 3.
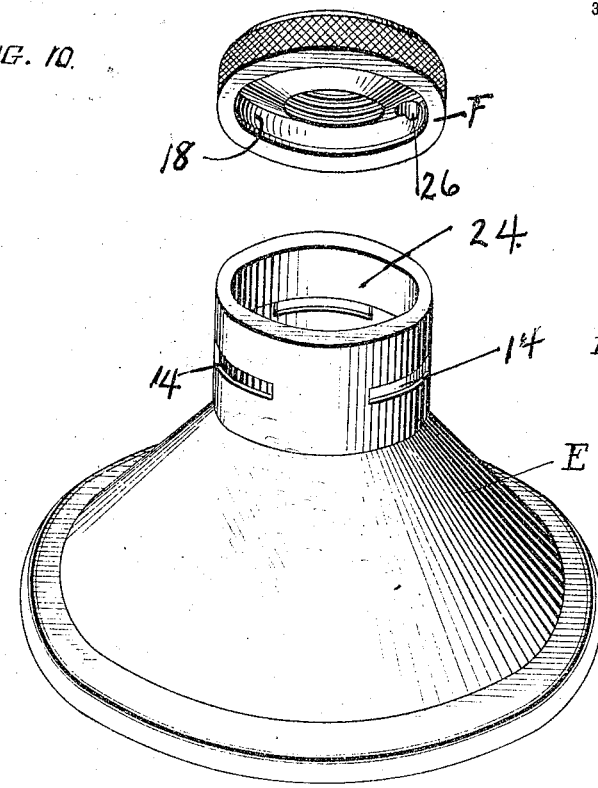
FIG. 10.
FIG. 8.
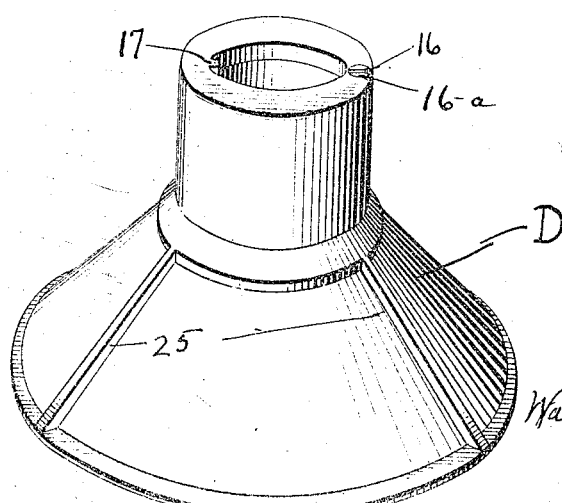
FIG. 9.
Witnesses
Edward A. Conroy
Lester L. Sargent
Waldo E. Callane
Inventor
By Jerry A. Mathews
Attorney

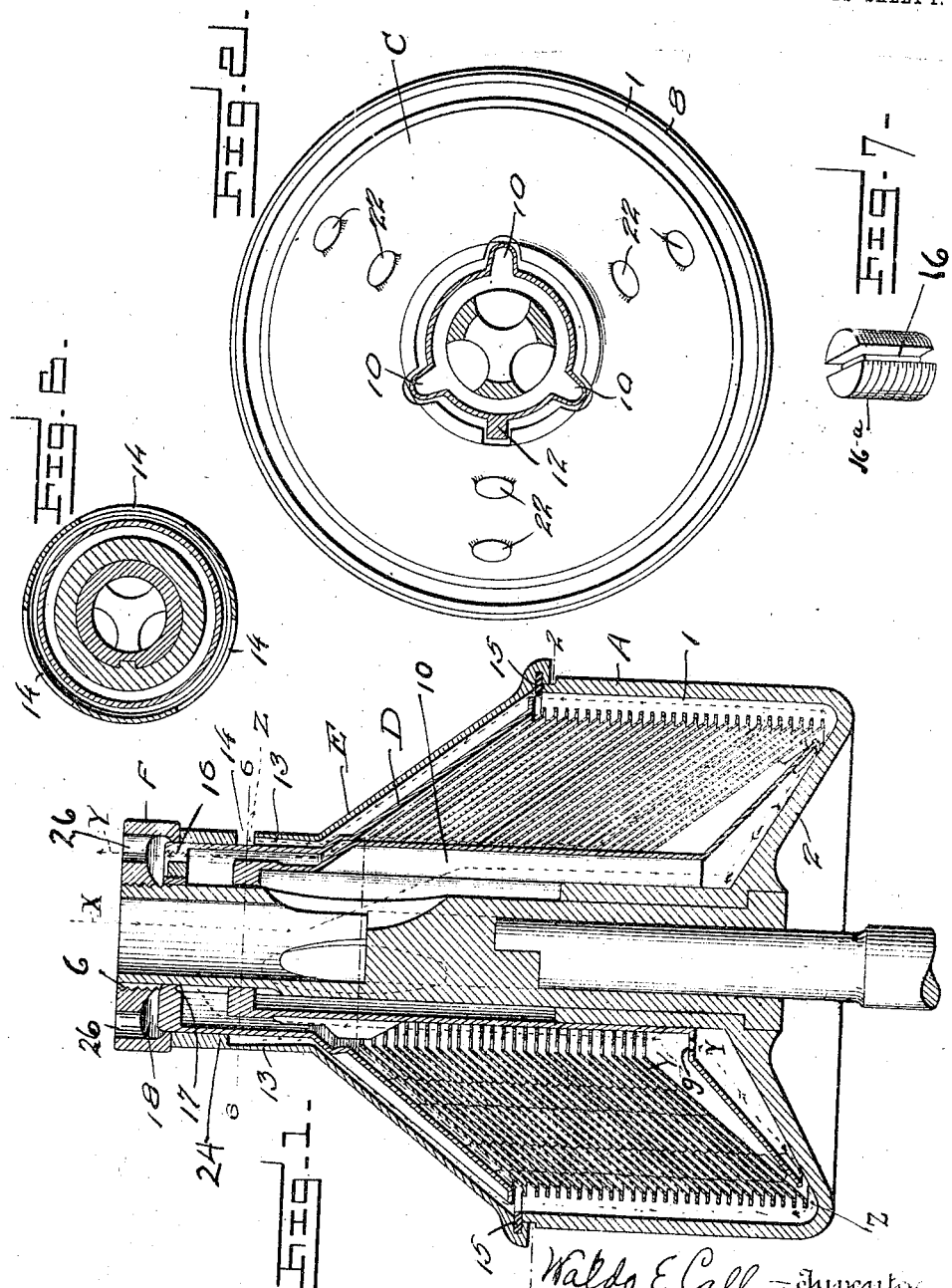

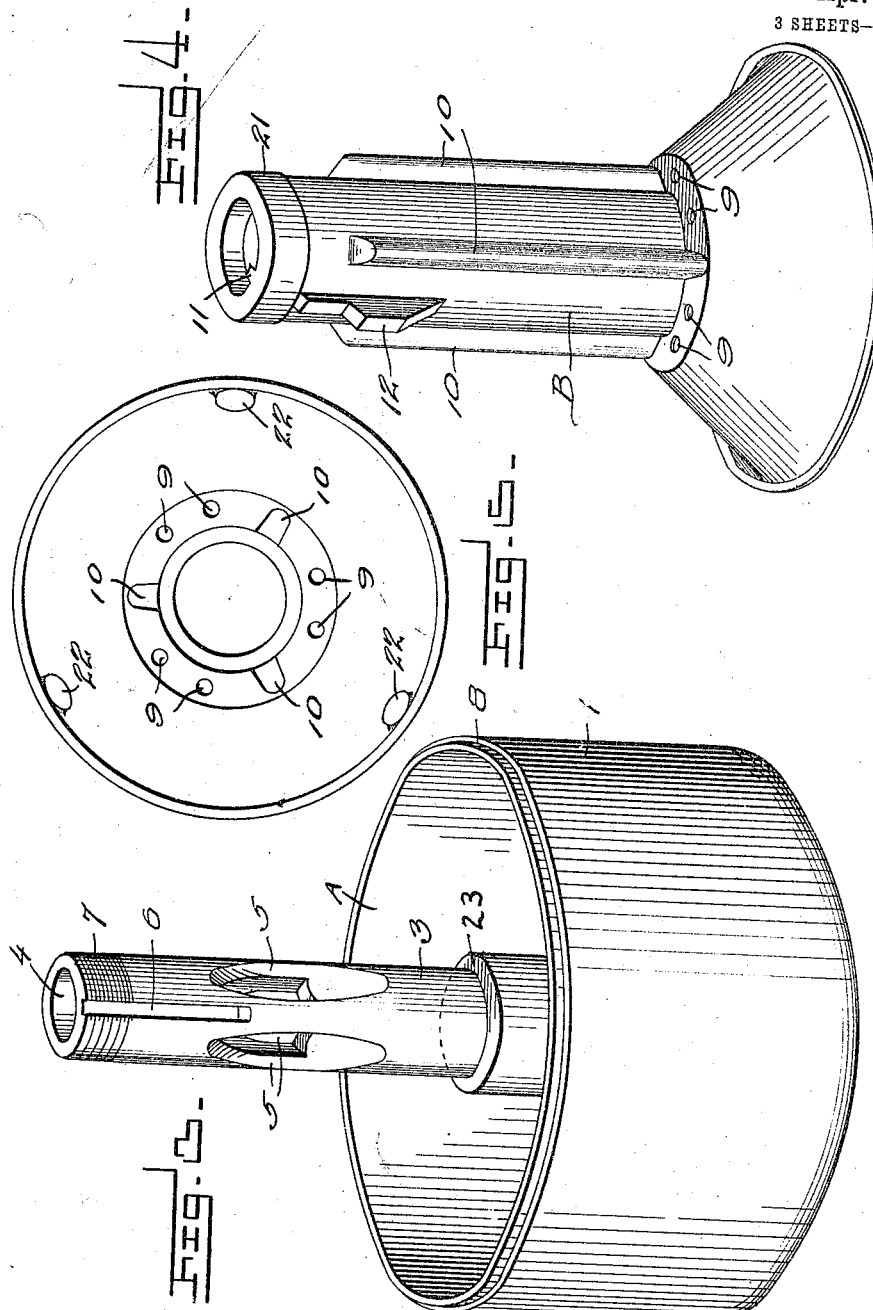

UNITED STATES PATENT OFFICE.

WALDO E. CALLANE, OF LEBANON, INDIANA.

CENTRIFUGAL CREAM-SEPARATOR.

1,136,654. Specification of Letters Patent. Patented Apr. 20, 1915.

Application filed March 23, 1914. Serial No. 826,670.

*To all whom it may concern:*

Be it known that I, WALDO E. CALLANE, a citizen of the United States, residing at Lebanon, in the county of Boone and State of Indiana, have invented a new and useful Centrifugal Cream-Separator, of which the following is a specification.

My invention relates to cream separators, and one of the main objects of my invention is the provision of an improved bowl member, integrally formed with a partially tubular center shaft, having a plurality of lateral channels in its upper portion opening out of a central milk channel; and the further provision of a removable tubular member having hollow wings positioned so as to coöperate with the lateral channels and having a conical base portion similar to the conical base of the bowl and having cream channels and milk channels as hereinafter to be described whereby an improved and novel operation of the separator results.

It is also an object of my invention to provide an improved and simple construction of bowl top and to provide channels for the milk to pass between the inside cream cone and the bowl top and to egress through lateral channels in the neck of the bowl.

It is a further object of my invention to provide a novel feed tube nut having an annular channel for the flow of cream, and from which opposite channels are provided for its egress.

It is a further object of my invention to provide a combination of parts in a cream separator in which only the end of the center shaft and the feed tube nut are threaded and which provide an effective fastening mechanism for the entire structure.

It is a further object of my invention to provide a bowl member having its sides extending approximately to the top of the liners or disks, so that a simple conical bowl top may be employed.

In it one of the principal objects of my invention is to provide an entirely sanitary separator, in which sharp angles, inaccessible grooves, crevices and corners which can not be cleaned are eliminated and in which the channel in the center shaft or tube is relatively short and in which the lateral channels are of such size and shape as to permit of easy and thorough cleaning of this part of the separator.

It is a further object of my invention to provide a cream separator that requires the minimum practicable number of separate elements to constitute the main elements of the combination.

It is also an object of my invention to provide a form of bowl and center shaft than can be manufactured and combined as an integral member at a relatively small cost of manufacture.

It is a minor object of my invention to provide an improved disk and to make various improvements in details of construction as are disclosed in the following description and accompanying drawings, in which—

Figure 1 is a vertical sectional view of my separator through its center; Fig. 2 is a horizontal section on line 2—2 of Fig. 1; Fig. 3 is a perspective view of the bowl and integral center shaft or tube; Fig. 4 is a perspective view of the removable winged tubular member or disk holder; Fig. 5 is a bottom plan view of the aforesaid member; Fig. 6 is a horizontal section on line 6—6 of Fig. 1; Fig. 7 is a detail view of the cream screw; Fig. 8 is a perspective view of the bowl top; Fig. 9 is a perspective view of the cream cone; Fig. 10 is a perspective view of my feed tube nut.

Like characters of reference indicate like parts throughout the several views.

Referring to the accompanying drawings, I provide a bowl and partially tubular center shaft member A, pressed into union and providing in effect an integral member (the center tube up through the bowl shell being pressed into the opening in the bottom of the shell, and after this the tube being pressed into its place with its shouldered portion in the concave part of the bowl shell.) Removably mounted on the aforesaid member A is a tubular member having hollow wings and a disk-supporting portion and which member as a whole is termed the disk holder and indicated by B. On this member are mounted suitable liners; and I prefer to employ the disks indicated by C. Over the uppermost disk is mounted cream cone D, illustrated in Fig. 9, and over the latter is mounted the bowl top E. The various parts of the separator are secured together by means of the feed tube nut F, which fastens to the threaded end 7 of the shaft 3. The contour of parts shown is important in consummating the sanitary construction of all parts so as to be readily cleaned.

Referring to the various parts in detail, it will be observed that member A comprises a bowl of sufficient depth to contain the liners or disks, or, in other words, having sides extending to points opposite the rim of the cream cone, approximately, and which is indicated by 1, and having a conical base 2, an integral center shaft 3, with the shoulder 23 formed integrally with the bowl in the process of manufacture. As shown in Fig. 1, the upper portion of the center shaft is tubular, a central feed channel being provided for the milk entering the separator and which is indicated by 4. Lateral channels 5 positioned in the upper portion of the center shaft, and shaped as shown in Figs. 1 and 3, open out of channel 4. The elliptical outline and beveled contour of these channels permit of easy and effective cleansing of the separator, a result which is impracticable where the central channel extends for the entire length of the center shaft, as has heretofore been the practice where a hollow center shaft was employed, or in which the lateral channels are of small size or positioned near the base of the bowl. In a cream separator the contour of parts is of importance from a sanitary standpoint, and I have avoided sharp angles in my construction. A suitable keyway 6 is provided in the upper end of the center shaft, for engagement with key 11 of the tubular disk holder B for the proper location of that member relative to the center shaft, required for the operation of my separator, hereinafter described. The upper end of center shaft 3 is threaded at 7 for engagement with feed tube nut F. A feature of the bowl is the elimination of screw threads on that member, there being merely groove 8 provided along the outer edge, with which the bowl top E engages as shown in Fig. 1.

Referring to details of my novel disk holder B, the tubular portion is provided with hollow wings 10 positioned opposite the lateral channels in center shaft 3, when the members A and B are assembled, to provide a channel for the downward passage of milk entering the separator. These members also serve as guides for the liners. Orifices 9 in the disk holder, as shown in Fig. 4, are provided for the upward passage of cream. A projecting band 21 on the upper end of member B affords convenient means for lifting the disk holder and disks out of the bowl to be cleaned. A disk-alining key 12 is also provided to insure proper positioning and balancing of parts.

The novel feature of my disks C is the entirely smooth interior or under surface, the disk-separating pieces 22 being welded to the outer or upper sides of the disks, and being of the form shown in Fig. 2, so as not to interfere with effective cleaning of the disks and affording no angles or corners which could not be readily cleaned. It should be noted that pieces 22 project from only one side of the disks, leaving an entirely smooth surface on the opposite side. Cream cone D is provided with a suitable cream channel 16, the size of which may be augmented by removal of cream screw 16ᵃ. Ribs 25 are provided on the exterior conical portion of the cream cone, as shown in Fig. 9, to contact with the bowl top.

A novel feature of bowl top E is the provision of lateral milk channels 14 opening out of the chambered or beveled neck of the bowl top, below the annular shoulder 24. Conduits are thus provided for the egress of milk between the cream cone D and bowl top E and out through lateral channels 14 in the bowl top neck. This obviates the employment of tubes and other more complicated structures for a like purpose. A rubber ring 15 is provided in a groove in the bottom edge of the bowl top, to afford means for securing the bowl top over the edge of the bowl without being threaded for engagement.

My feed tube nut F is of novel construction. It has an annular channel 18 which affords a conduit for cream, and out of which cream flows through channels 26, which are oppositely positioned for convenience in disassembling the separator. Only the inner portion of the feed tube nut is threaded, it will be noted from Fig. 10.

In disassembling the separator, feed tube nut F is unscrewed from its engagement with threaded portion 7 of center shaft 3. Bowl top E, cream cone D and disk holder B are then removed, in order. In assembling the device keys 11 and 17 of the disk holder and cream cone, respectively, engage in keyway 6 of the center shaft. The disks are uniformly disposed to secure proper balancing.

In operation the whole milk entering the separator travels downward through center channel 4, thence through lateral channels 5, as indicated by the line X in Fig. 1, into the hollow wings 10, to the upper end of which the lateral channels 5 direct the flow of milk, which thence travels vertically downward in the channels formed by hollow wings 10 to the base of the bowl, cream tending to flow back through orifices 9 in the path indicated by the dotted line Y in Fig. 1, and the separated milk following the path indicated by the dotted line Z, as shown in Fig. 1. As will be understood, the milk is thrown outward centrifugally and travels in a path adjacent to sides 1, the cream tending to flow inward and follow a path adjacent the exterior of the tubular portion of the disk holder, through channel 16 of the cream cone, annular channel 18 of the feed tube nut, and out through channels 26 of that member. The separated milk passing through the channel between the exterior of the cream cone and the interior of the bowl top, flows from lateral channels 14 (see Figs. 8 and 1) as indicated by line Z in Fig. 1. This operation is effected by novel beveled neck 13 of the bowl top and shoulder 24. By conducting the milk to the base of the bowl through hollow wings 10, the full effect of the centrifugal force produced by the separator is had, and the milk and cream are more thoroughly separated than is the case in separators in which milk is permitted to flow between liners before reaching the base of the bowl.

It is to be understood that I may substitute a different type of liner than the disks shown in the accompanying drawings, or make other changes in details of construction.

What I claim is:

1. In a centrifugal separator, the combination of an integral bowl and center shaft member having inclined lateral channels in the upper end of the center shaft, a central channel extending to its top, and a deep bowl member having a concave base, a removable disk holder having a tubular portion with hollow vertical wings disposed in alinement with the lateral channels opening out of the tubular portion of the center shaft and having orifices at its base for the backflow of cream, liner or disk members positioned within the bowl, a channeled cream cone, a bowl top having a beveled neck portion and lateral channels opening out of same, and an annular channeled feed tube nut having cream channels opening out of the annular channel, the aforesaid member being threaded to engage with the upper end of the center shaft to fasten all parts of the separator in position for operation, substantially as set forth.

2. A cream separator feed tube nut interiorly threaded to engage over the end of a separator center shaft, and having an inner annular cream channel positioned adjacent the threaded portion and channels for the egress of cream therefrom through the top of the feed nut, as shown.

In witness whereof I hereunto set my hand in the presence of two witnesses.

WALDO E. CALLANE.

Witnesses:
 GUY M. VERIS,
 JOHN L. SAUNDERS.